Patented Sept. 9, 1941

2,255,422

UNITED STATES PATENT OFFICE 2,255,422

PROCESS FOR THE PRODUCTION OF MAGNESIUM HYDROXIDE

Sheldon B. Heath and Raymond J. Anderson, Midland, Mich., assignors to The Dow Chemical Company, Midland, Mich., a corporation of Michigan No Drawing. Application February 23, 1939, Serial No. 257,970

6 Claims. (Cl. 23—201)

This invention concerns an improved process for the production of magnesium hydroxide from natural or artificial brines containing convertible magnesium salts, and in particular relates to a process whereby magnesium hydroxide is precipitated from such brines in a rapidly settling and readily filterable form.

It is known that magnesium hydroxide may be obtained from brines containing magnesium chloride or other convertible magnesium salts, e. g. magnesium sulphate, magnesium bromide, etc., by treating such brines with calcium hydroxide, the latter usually being employed in the form of a dilute aqueous suspension. The calcium hydroxide reacts with the magnesium salts to form the corresponding calcium compounds and the soluble magnesium salts are converted into insoluble magnesium hydroxide. The magnesium hydroxide prepared in this manner, however, is obtained in the form of an amorphous or gelatinous precipitate which has a very low settling rate, i. e. 0.05–0.30 foot per hour, and which is very difficult to filter and wash free of calcium salts and other impurities.

It is an object of this invention to provide a method for the production of magnesium hydroxide from brines containing convertible magnesium salts whereby the magnesium hydroxide is obtained as a crystalline or granular precipitate which has a high settling rate and which is readily filtered and washed.

We have found that the form of precipitated magnesium hydroxide obtained when magnesium-containing brines, e. g. magnesium chloride brines, natural brines such as sea water, bitterns, inland brines, etc., are treated with calcium hydroxide in accordance with the general method described above, depends largely upon the manner in which the calcium hydroxide suspension has been prepared. More specifically, we have found that the magnesium hydroxide is precipitated in granular and readily filterable form when the calcium hydroxide contains small amounts of calcium sulphate as a result of its having been prepared by slaking calcium oxide with water in the presence of small amounts of a soluble sulphate.

In preparing magnesium hydroxide according to the invention, a finely-divided high-calcium or dolomitic lime is slaked with approximately 5 parts by weight of water in the presence of a small amount of a soluble sulphate. The slaking step is conveniently carried out by dissolving the sulphate, e. g. sodium sulphate, sodium acid sulphate, potassium sulphate, sulphuric acid, calcium sulphate, magnesium sulphate, etc., in the water in such amount that the concentration of sulphate ion is approximately 0.1 to 30.0, preferably 0.5, grams per liter. This concentration of sulphate ion corresponds to a sodium sulphate concentration of approximately 0.15 to 45.0 grams per liter. If desired, sea water or other natural brine which contains approximately 0.1 to 30.0 grams of sulphate ion per liter may be employed in slaking the lime, although we prefer to use fresh water to which has been added the desired amount of soluble sulphate. The slaking process is preferably carried out at ordinary temperatures, i. e. 20° to 30° C., although higher temperatures, e. g. 60°–90° C. may be employed. The calcium hydroxide suspension thus obtained is usually allowed to settle for a short time and, if desired, the supernatant liquid may be drawn off and re-employed in the slaking process. The thickened calcium hydroxide suspension is then introduced directly into the magnesium-containing brine, preferably with gentle agitation and at such a rate that the time required for the addition is approximately 1–15 minutes. Ordinarily, we prefer to employ the calcium hydroxide in an amount somewhat less than that theoretically required to react with all of the magnesium salts present in the brine in order that the precipitated magnesium hydroxide may be as free as possible from calcium hydroxide.

The magnesium hydroxide precipitates in a crystalline or granular form which is characterized by having a high settling rate, i. e. 50–60 feet per hour, and a high filter rate, i. e. 10–150 gallons per square foot per hour. After addition of the calcium hydroxide, the precipitate is allowed to settle and is removed as an underflow concentrate which may be filtered and washed by ordinary methods. Inasmuch as the granular precipitate tends to change gradually into the amorphous form of magnesium hydroxide upon standing over long periods of time, it is preferable to filter and wash the precipitate within a short time after it is settled, for example, in about 30 minutes to 1 hour, although it may be allowed to stand for somewhat longer periods of time without greatly affecting its filter rate.

The relation between the concentration of sulphate ion in the slaking water and the filter rate of the precipitated magnesium hydroxide is shown by the data tabulated below. These data were determined by slaking a finely-divided (200 mesh) high-calcium lime (89.3 per cent available CaO) with 5 parts of cold fresh water containing sodium sulphate in the concentration stated, and thereafter treating sea water with the resulting calcium hydroxide suspensions. In each case the precipitated magnesium hydroxide was allowed to settle for several minutes and was then filtered, the filter rate being determined and expressed in terms of gallons of filtrate per square foot of filter area per hour.

Table

| Grams sulphate ion per liter of slaking water | Filter rate |
|---|---|
| 0.00 | 2.9 |
| 0.05 | 9.4 |
| 0.10 | 13.8 |
| 0.20 | 16.4 |
| 0.25 | 16.3 |
| 0.50 | 36.4 |
| 1.0 | 32.2 |
| 2.0 | 34.8 |
| 3.0 | 27.6 |
| 10.0 | 30.4 |
| 20.0 | 28.1 |

The following example illustrates one way in which the principle of our invention has been applied but is not to be construed as limiting the same.

Example 3.2 parts by weight of high-calcium lime was ground to 200 mesh and was slaked with 16 parts of cold water to which had been added 0.07 part of sodium sulphate. The calcium hydroxide suspension so prepared was added with gentle agitation to 1000 parts of sea water, the time required for the addition being approximately 1 minute. Magnesium hydroxide was precipitated in a granular form having a settling rate of approximately 50 feet per hour. The precipitate was allowed to settle for about 30 minutes, after which 200 parts of underflow concentrate was drawn off. The clear supernatant liquir contained less than 1 per cent of the total suspended solids. The concentrate was then filtered on a rotary filter at a rate of 50 gallons per square foot per hour, and was washed, whereby there was obtained approximately 16 parts of wet filter cake containing approximately 3 parts of magnesium hydroxide.

Other modes of applying the principle of our invention may be employed instead of those explained, change being made as regards the process herein disclosed, provided the step or steps stated by any of the following claims or the equivalent of such stated step or steps be employed.

We therefore particularly point out and distinctly claim as our invention:

1. In a process for the production of magnesium hydroxide in a rapidly settling and readily filterable form from brines containing dissolved magnesium salts, the steps which comprise treating calcium oxide with water having dissolved therein a small amount of a soluble sulphate to form a suspension of calcium hydroxide, said amount of soluble sulphate being sufficient to yield at least about 0.1 gram per liter of sulphate ions, and thereafter adding said suspension to the brine to precipitate magnesium hydroxide therefrom.

2. In a process for the production of magnesium hydroxide in a rapidly settling and readily filterable form from brines containing dissolved magnesium salts, the steps which comprise treating calcium oxide with water containing from about 0.1 to about 30.0 grams per liter of sulphate ion to form a suspension of calcium hydroxide, and thereafter adding said suspension to the brine to precipitate magnesium hydroxide therefrom.

3. In a process for the production of magnesium hydroxide in a rapidly settling and readily filterable form from brines containing dissolved magnesium salts, the steps which comprise treating calcium oxide with water containing from about 0.1 to about 30.0 grams per liter of sulphate ion to form a suspension of calcium hydroxide, adding said suspension to the brine to precipitate magnesium hydroxide therefrom, and thereafter separating the precipitated magnesium hydroxide from the brine.

4. In a process for the production of magnesium hydroxide from brines containing dissolved magnesium salts, the steps which comprise treating calcium oxide with water containing from about 0.1 to about 30.0 grams per liter of sulphate ion to form a suspension of calcium hydroxide, adding said suspension to the brine to precipitate magnesium hydroxide, allowing the precipitated magnesium hydroxide to settle, and thereafter separating the settled precipitate from the supernatant liquid.

5. In a process for the production of magnesium hydroxide from brines containing dissolved magnesium salts, the steps which comprise treating calcium oxide with water containing from about 0.1 to about 30.0 grams per liter of sulphate ion to form a suspension of calcium hydroxide, contacting said suspension with the brine, the amount of calcium hydroxide being less than that required to react with all of the magnesium salts dissolved in the brine, to precipitate magnesium hydroxide, allowing the precipitated magnesium hydroxide to settle, and thereafter separating the settled precipitate from the supernatant liquid.

6. In a process for the production of magnesium hydroxide from brines containing dissolved magnesium salts, the steps which comprise treating calcium oxide with approximately 5 parts by weight of water having dissolved therein from about 0.15 to about 45.0 grams per liter of sodium sulphate to form a suspension of calcium hydroxide, adding said suspension to the brine, the amount of calcium hydroxide being less than that required to react with all of the magnesium salts dissolved in the brine, to precipitate magnesium hydroxide, allowing the precipitated magnesium hydroxide to settle, and thereafter separating the settled precipitate from the supernatant liquid.

SHELDON B. HEATH.
RAYMOND J. ANDERSON.